US008077442B2

(12) United States Patent
Saito et al.

(10) Patent No.: US 8,077,442 B2
(45) Date of Patent: Dec. 13, 2011

(54) LIGHTNING ARRESTER AND METHOD OF MANUFACTURING AND ASSEMBLING THE SAME

(75) Inventors: Hiroki Saito, Tokyo (JP); Hiroki Kajino, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 457 days.

(21) Appl. No.: 12/360,425

(22) Filed: Jan. 27, 2009

(65) Prior Publication Data

US 2010/0014206 A1 Jan. 21, 2010

(30) Foreign Application Priority Data

Jul. 15, 2008 (JP) ................................ 2008-183903

(51) Int. Cl.
*H02H 1/00* (2006.01)

(52) U.S. Cl. ........................................ 361/127

(58) Field of Classification Search .................. 361/117, 361/126, 127

See application file for complete search history.

(56) References Cited

U.S. PATENT DOCUMENTS

| | | | | |
|---|---|---|---|---|
| 3,881,348 | A * | 5/1975 | Morton | 73/862.542 |
| 4,404,614 | A * | 9/1983 | Koch et al. | 361/128 |
| 4,476,513 | A * | 10/1984 | Stenstrom | 361/127 |
| 5,159,748 | A * | 11/1992 | Doone et al. | 29/613 |
| 5,680,289 | A * | 10/1997 | Robinson et al. | 361/127 |
| 6,396,676 | B1 * | 5/2002 | Doone et al. | 361/117 |
| 7,433,169 | B2 * | 10/2008 | Kamel et al. | 361/127 |
| 7,660,093 | B2 * | 2/2010 | Krause | 361/117 |
| 2007/0253136 | A1 * | 11/2007 | Groth et al. | 361/127 |
| 2009/0042457 | A1 * | 2/2009 | Normoyle et al. | 439/877 |

FOREIGN PATENT DOCUMENTS

| | | | |
|---|---|---|---|
| JP | 3-219580 | A | 9/1991 |
| JP | 10-41105 | A | 2/1998 |
| JP | 2000-216007 | A | 8/2000 |
| JP | 2001-345201 | A | 12/2001 |
| JP | 2002-231509 | A | 8/2002 |
| JP | 2002-260905 | A | 9/2002 |
| JP | 2002-270406 | A | 9/2002 |
| JP | 2004-71972 | A | 3/2004 |
| JP | 2005-33033 | | 2/2005 |
| JP | 2007-281353 | A | 10/2007 |

* cited by examiner

*Primary Examiner* — Rexford Barnie
*Assistant Examiner* — Christopher Clark
(74) *Attorney, Agent, or Firm* — Buchanan Ingersoll & Rooney PC

(57) ABSTRACT

A pair of electrodes sandwiches a serial unit that includes a nonlinear voltage resistor block and a compression spring, which is coupled by a plurality of insulating rods. Each of the electrodes has a plurality of insulating-rod inserting holes and a plurality of fastening-member mounting holes each perpendicular to a corresponding insulating-rod inserting hole. Both ends of each of the insulating rods have a fastening-member through hole such that the insulating rods and the electrodes are fastened by inserting a plurality of fastening members through the fastening-member and mounting the fastening members on the fastening-member mounting holes.

6 Claims, 5 Drawing Sheets

LIGHTNING ARRESTER AND METHOD OF MANUFACTURING AND ASSEMBLING THE SAME

BACKGROUND OF THE INVENTION

1. Field of the Invention

The present invention relates to a technology for manufacturing and assembling a lightning arrester.

2. Description of the Related Art

An electric power facility such as an electric power station or an electric power substation needs to have good aseismic capacity for maintaining safe power supply. To achieve such aseismic capacity, air-insulated lightning arresters are installed in an electric power facility. Currently, an air-insulated lightning arrester predominately includes a porcelain bushing insulator (hereinafter, "porcelain type lightning arrester"). However, instead of a porcelain bushing insulator, a polymer insulator can also be used in an air-insulated lightning arrester (hereinafter, "polymer type lightning arrester"). A polymer insulator includes a zinc oxide element around which silicon rubber is directly molded. A polymer type lightning arrester is smaller and lighter as compared to a porcelain type lightning arrester, as well as has better aseismic capacity and pressure-relief capacity. For that reason, in recent years, there is an increasing trend of installing polymer type lightning arresters in an electric power facility.

A polymer type lightning arrester includes a plurality of nonlinear voltage resistors (i.e., zinc oxide elements) stacked to form a serially-connected resistor unit. The serially-connected resistor unit is sandwiched between two electrodes. The polymer type lightning arrester is covered from outside by integrally molding an outer insulating cover such as silicon rubber. However, a polymer resin such as silicon rubber cannot support on its own the structure of the polymer type lightning arrester. Thus, to increase the mechanical strength of the polymer type lightning arrester, insulating rods made of fiber-reinforced plastics are fixed between the electrodes.

Meanwhile, if an abnormal voltage such as a lightning induced surge that exceeds the capacity of a polymer type lightning arrester occurs, there is a possibility that the nonlinear voltage resistors get damaged. In that case, an internal electric arc occurs such that a large amount of gas is discharged because of the arc heat. That causes a sudden increase in the internal pressure of the polymer type lightning arrester. To prevent the polymer type lightning arrester from exploding due to sudden increase in the pressure, the outer insulating cover rips such that the gas is released outside such that the internal pressure decreases. Moreover, the insulating rods prevent the broken pieces of the constituent elements of the polymer type lightning arrester from flying around and to maintain the electrodes intact in their fixed positions.

Japanese Patent Application Laid-open No. 2002-270406 discloses a lightning arrester in which an insulating rod with a retaining member on one end is fixed to a pair of electrodes in the following manner. First, one end of the insulating member is inserted into an insulating-rod fixing hole created on one of the electrodes. The other end of the insulating rod is then inserted through a cylindrically protruded hole created on the other electrode. Subsequently, the part of the insulating rod protruding from the protruded hole is crimped. However, when such a structure is subjected to a stress that works in the direction of pushing away the electrodes, then a tensile force in the direction of unfastening the crimping is absorbed by the frictional force between the insulating rod and the electrode having the protruded hole. As a result, there is a possibility that the insulating rod gets unfixed from the pair of electrodes.

Generally, a polymer type lightning arrester is used in multiple stacks depending on a rated voltage. However, because the rated voltage of a single polymer type lightning arrester is far less than that of a single porcelain type lightning arrester, it is necessary to stack a large number of polymer type lightning arresters to obtain the same rated voltage as that of the porcelain type lightning arrester. As a result, the process of assembling the lightning arrester unit becomes complicated thereby affecting the productivity of the polymer type lightning arresters.

Moreover, while stacking a large number of polymer type lightning arresters, it is necessary to use an equivalent number of connecting components to interconnect the polymer type lightning arresters. Thus, the necessary number of components for assembly increases thereby affecting efficiency in the on-site installation of the lightning arrester unit.

SUMMARY OF THE INVENTION

It is an object of the present invention to at least partially solve the problems in the conventional technology.

According to one aspect of the present invention, there is provided a lightning arrester including a serial unit that includes a nonlinear voltage resistor block formed with a stack of a plurality of nonlinear voltage resistors and a compression spring that is arranged at one end of the nonlinear voltage resistor block and that exerts a predetermined tension on the nonlinear voltage resistor block in its stacking direction; a pair of electrodes arranged to sandwich the serial unit in its stacking direction; a plurality of insulating rods arranged around the serial unit along its stacking direction to couple the electrodes; a plurality of fastening members that fastens the insulating rods and the electrodes; and an insulating outer covering member that integrates internal elements including the serial unit and the insulating rods by directly covering the internal elements. Each of the electrodes has a plurality of insulating-rod inserting holes for inserting end portions of the insulating rods and a plurality of fastening-member mounting holes each being perpendicular to a corresponding insulating-rod inserting hole. Both end portions of each of the insulating rods have a fastening-member through hole such that the insulating rods and the electrodes are fastened by inserting the fastening members through fastening-member through holes and mounting the fastening members on the fastening-member mounting holes.

Furthermore, according to another aspect of the present invention, there is provided a method of manufacturing a lightning arrester including a serial unit that includes a nonlinear voltage resistor block formed with a stack of a plurality of nonlinear voltage resistors and a compression spring that is arranged at one end of the nonlinear voltage resistor block and that exerts a predetermined tension on the nonlinear voltage resistor block in its stacking direction, a pair of electrodes arranged to sandwich the serial unit in its stacking direction, a plurality of insulating rods arranged around the serial unit along its stacking direction to couple the electrodes, a plurality of fastening members that fastens the insulating rods and the electrodes, and an insulating outer covering member that integrates internal elements including the serial unit and the insulating rods by directly covering the internal elements. The method includes forming a plurality of insulating-rod inserting holes for inserting end portions of the insulating rods and a plurality of fastening-member mounting holes each being perpendicular to a corresponding insulating-rod inserting hole on the electrodes; forming a fastening-member through hole on both end portions of each of the insulating rods; inserting the both end portions of each of the insulating rods into the insulating-rod inserting holes, respectively; exerting the tension on the serial unit by the compression spring in a direction of compressing a distance between the electrodes; aligning the fastening-member inserting holes with the fastening-member through holes; inserting the fastening members through the fastening-member through holes; and fastening the insulating rods and the electrodes by mounting the fastening members on the fastening-member mounting holes.

Moreover, according to still another aspect of the present invention, there is provided a method of assembling a lightning arrester by using an assembly jig. The lightning arrester includes a serial unit that includes a nonlinear voltage resistor block formed with a stack of a plurality of nonlinear voltage resistors and a compression spring that is arranged at one end of the nonlinear voltage resistor block and that exerts a predetermined tension on the nonlinear voltage resistor block in its stacking direction, a pair of electrodes including an upper electrode and a lower electrode arranged to sandwich the serial unit in its stacking direction, a plurality of insulating rods arranged around the serial unit along its stacking direction to couple the electrodes, a plurality of fastening members that fastens the insulating rods and the electrodes, and an insulating outer covering member that integrates internal elements including the serial unit and the insulating rods by directly covering the internal elements. The assembly jig includes an upper plate and a lower plate arranged opposite to each other at a distance regulated by a predetermined spring load exerted on the serial unit. The method includes fitting on end of each of the insulating rods to the lower electrode; inserting a jack between the upper electrode and the upper plate; and assembling the lightning arrester in a state in which a predetermined repulsing force is exerted between the lower electrode and the upper electrode.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings. The present invention is not limited to these exemplary embodiments.

Figure 1:
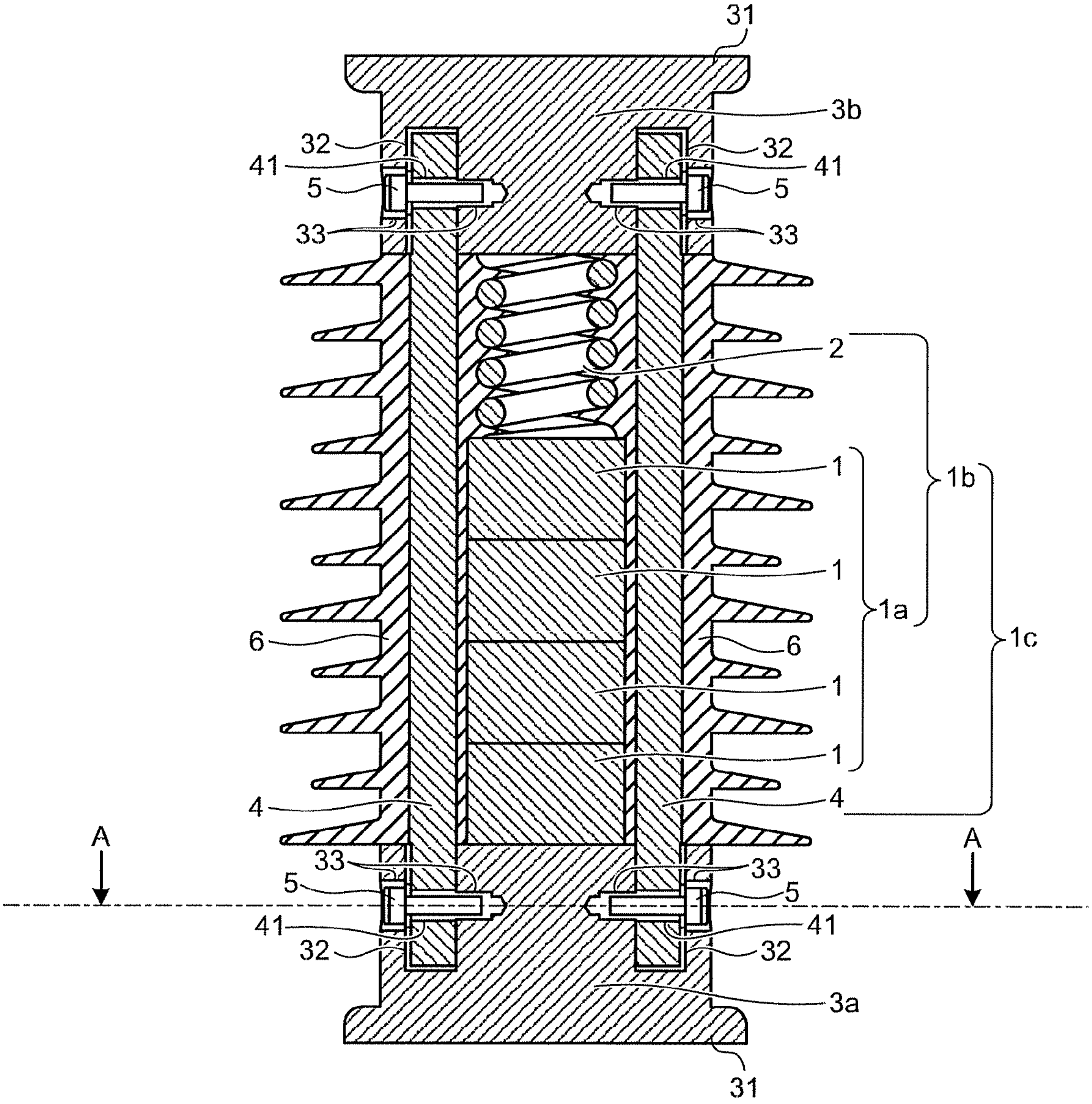
FIG. 1 is a vertical cross-sectional view of an exemplary lightning arrester according to an embodiment of the present invention.
Figure 2:
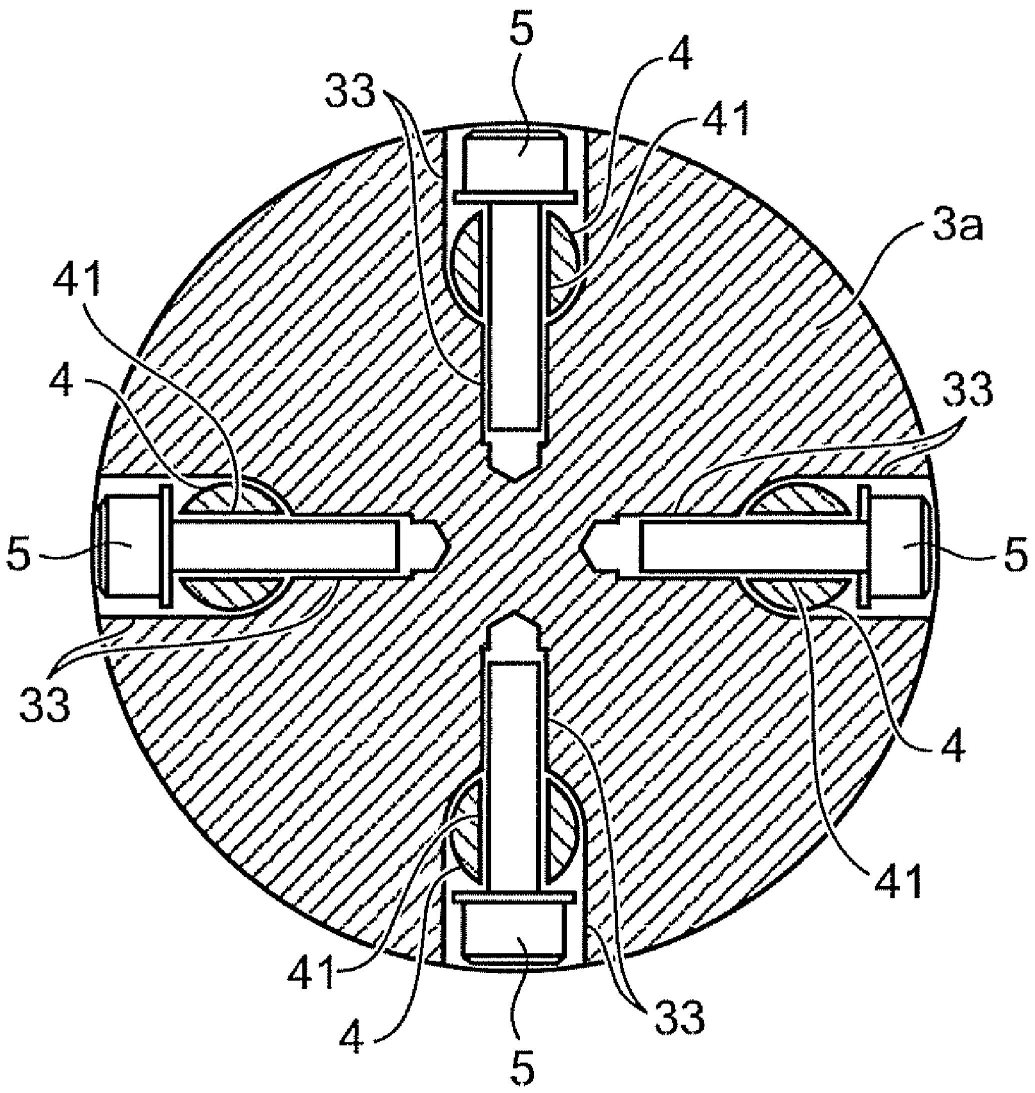
FIG. 2 is an A-A cross-sectional view of the lightning arrester viewed from a direction indicated by arrows in FIG. 1.

FIG. 1 is a vertical cross-sectional view of an exemplary lightning arrester according to an embodiment of the present invention. FIG. 2 is an A-A cross-sectional view of the lightning arrester viewed from a direction indicated by arrows in FIG. 1.

The lightning arrester includes a zinc oxide element block 1*a* that is fabricated by stacking a plurality of zinc oxide elements 1 at the central part of the lightning arrester. The zinc oxide elements 1 function as nonlinear voltage resistors. A pressing spring 2 is arranged in a compressed state at one end of the zinc oxide element block 1*a*. The zinc oxide element block 1*a* and the pressing spring 2 combinedly form a serially-connected resistor unit 1*b*. A lower electrode 3*a* is arranged beneath the serially-connected resistor unit 1*b*, while an upper electrode 3*b* is arranged on the serially-connected resistor unit 1*b*. Each of the lower electrode 3*a* and the upper electrode 3*b* has a plurality of insulating-rod fixing holes 32 into which a plurality of insulating rods 4 fit. The insulating rods 4 are arranged along and around the zinc oxide element block 1*a*.

In addition to the insulating-rod fixing holes 32, each of the lower electrode 3*a* and the upper electrode 3*b* has a plurality of fastening-member fixing holes 33, which are side holes. Each fastening-member fixing hole 33 is created perpendicular to the corresponding insulating-rod fixing hole 32. A plurality of bolts 5 is used as fastening members that are inserted through the fastening-member fixing holes 33 for fixing the insulating rods 4 to the lower electrode 3*a* and the upper electrode 3*b*. Thus, to facilitate insertion of the bolt 5, the inner portion of each fastening-member fixing hole 33 is created to have the shape of a blind screw hole, while the outer portion is created to have the shape of a cut hole through which the head of the bolt 5 can pass.

A fastening-member through hole 41 is created on both ends of each insulating rod 4. When both ends of each insulating rod 4 fit into the corresponding insulating-rod fixing holes 32, the fastening-member fixing holes 33 and the corresponding fastening-member through holes 41 are positioned in alignment. Thus, when the bolts 5 are tightened from the side surfaces of the lower electrode 3*a* and the upper electrode 3*b*, they pass through the corresponding fastening-member through holes 41 and get fixed into the corresponding fastening-member fixing holes 33. As a result, each end of each insulating rod 4 is sandwiched between the head of the corresponding bolt 5 and the side surface of the corresponding electrode from among the lower electrode 3*a* and the upper electrode 3*b*. In this way, the insulating rods 4 are fixed to the lower electrode 3*a* and the upper electrode 3*b*. Due to such a structure, the stress that works in the direction of pushing away the lower electrode 3*a* and the upper electrode 3*b* as well as the reaction force of the pressing spring 2 acts in a perpendicular direction to the direction in which the bolts 5 are inserted. Thus, because of the reaction force, the insulating rods 4 remain tightly fixed to the lower electrode 3*a* and the upper electrode 3*b*. Meanwhile, instead of using the bolts 5, other types of bolts such as bolts having a screw tip can also be used. Moreover, a silicon rubber 6 is integrally molded as an outer insulating cover for the lightning arrester.

Figure 3:
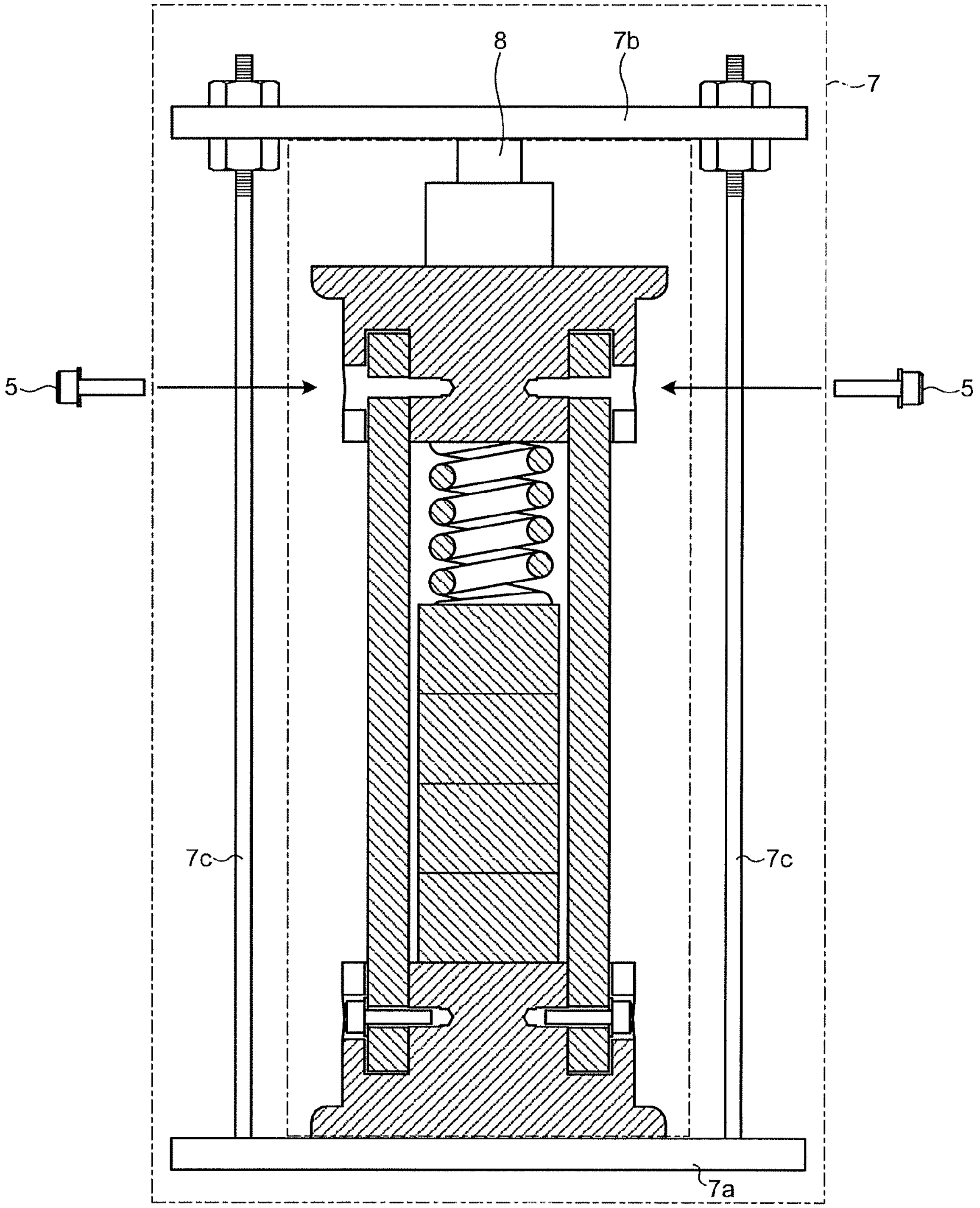
FIG. 3 is a vertical cross-sectional view for explaining an exemplary assembly of the lightning arrester by using an assembly jig.

FIG. 3 is a vertical cross-sectional view for explaining an exemplary assembly of the lightning arrester by using an assembly jig. In that assembly, the distance between the fastening-member through holes 41 on both ends of each insulating rod 4 is regulated by the length of the pressing spring 2 when a predetermined spring load is applied thereto. In other words, the distance between the lower electrode 3*a* and the upper electrode 3*b*, i.e., the height of the lightning arrester in the stacking direction of the zinc oxide elements 1 is regulated by applying a predetermined spring load. That is, there is no need to set the spring load by adjusting the height of the lightning arrester. Thus, by regulating the height of the lightning arrester under the abovementioned condition, it is possible to assemble the lightning arrester by using an assembly jig 7, which includes a lower plate 7*a*, an upper plate 7*b*, a plurality of supporting rods 7*c*, and a jack 8. The lower plate 7*a* and the upper plate 7*b* are arranged opposite to each other within a distance calculated by adding the heights of the lightning arrester and the jack 8. The supporting rods 7*c* are used to fix the lower plate 7*a* to the upper plate 7*b*.

Given below is the detailed description of assembling the lightning arrester by using the assembly jig 7. First, the lower electrode 3*a* is arranged on the lower plate 7*a*. In the lower electrode 3*a*, one end of each insulating rod 4 fits into the corresponding insulating-rod fixing hole 32 and is fixed by using the corresponding bolt 5. Then, the zinc oxide element block 1*a* is fabricated on the lower electrode 3*a* by stacking thereon the zinc oxide elements 1. The pressing spring 2 is arranged on the zinc oxide element block 1*a* to combinedly form the serially-connected resistor unit 1*b*. Subsequently, the upper electrode 3*b* is arranged on the serially-connected resistor unit 1*b* by inserting the other end of each insulating rod 4 into the corresponding insulating-rod fixing hole 32 in the upper electrode 3*b* and fixing each insulating rod 4 to the upper electrode 3*b* by using the corresponding bolt 5.

The jack 8 is then inserted in the space between the upper electrode 3*b* and the upper plate 7*b*. A predetermined spring load is applied to the jack 8 such that the predetermined spring load is transmitted to the pressing spring 2. As described above, the distance between the fastening-member through holes 41 on both ends of each insulating rod 4 is regulated by the length of the pressing spring 2 when a predetermined spring load is applied thereto. Thus, when a predetermined spring load is applied to the pressing spring 2 by using the jack 8, each fastening-member fixing hole 33 and the corresponding fastening-member through hole 41 in the upper electrode 3*b* align along the hole direction. In that situation, the bolts 5 are tightened for fixing the insulating rods 4 to the upper electrode 3*b*. In this way, it is possible to assemble the lightning arrester by using the assembly jig 7 in which the distance between the lower plate 7*a* and the upper plate 7*b* is regulated. Such an assembly improves efficiency while assembling the lightning arrester. Moreover, it is possible to curb fluctuation in the internal dimensions and the strength while manufacturing lightning arresters.

Furthermore, because the distance between the fastening-member through holes 41 on both ends of each insulating rod 4 is regulated, a uniform biasing force in the vertical direction can be applied to the serially-connected resistor unit 1*b*. As a result, the frictional force between the insulating rods 4 and each of the lower electrode 3*a* and the upper electrode 3*b* can be increased thereby improving the strength of the lightning arrester against, e.g., displacement due to torsion.

Moreover, improvement in the strength against the tensile force and against the reaction force of the pressing spring 2 results in improving the aseismic capacity of the lightning arrester. Furthermore, because the insulating rods 4 remain tightly fixed to the lower electrode 3*a* and the upper electrode 3*b*, it is possible to maintain the improved aseismic capacity over a long period of time.

Figure 4:
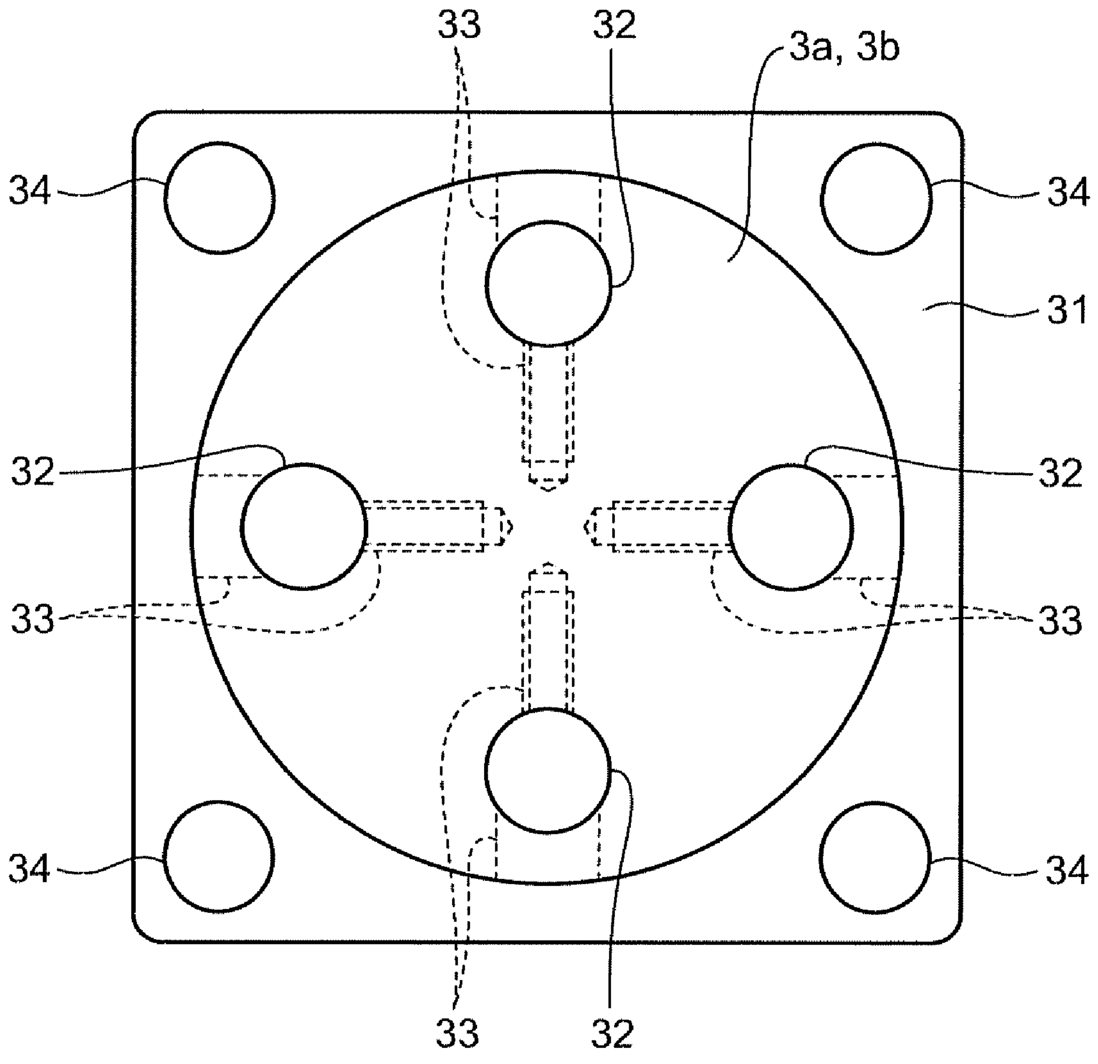
FIG. 4 is a planar view of the lightning arrester when viewed from a direction in which a pair of electrodes is connected to a serially-connected resistor unit.

Given below is the description of a structure assembled by stacking two of the abovementioned lightning arresters. FIG. 4 is a planar view of the lightning arrester when viewed from a direction in which the lower electrode 3*a* and the upper electrode 3*b* are connected to the serially-connected resistor unit 1*b*. As shown in FIG. 4, a flange 31 is arranged in each of the lower electrode 3*a* and the upper electrode 3*b*. The flange 31 has a plurality flange through holes 34.

Figure 5:
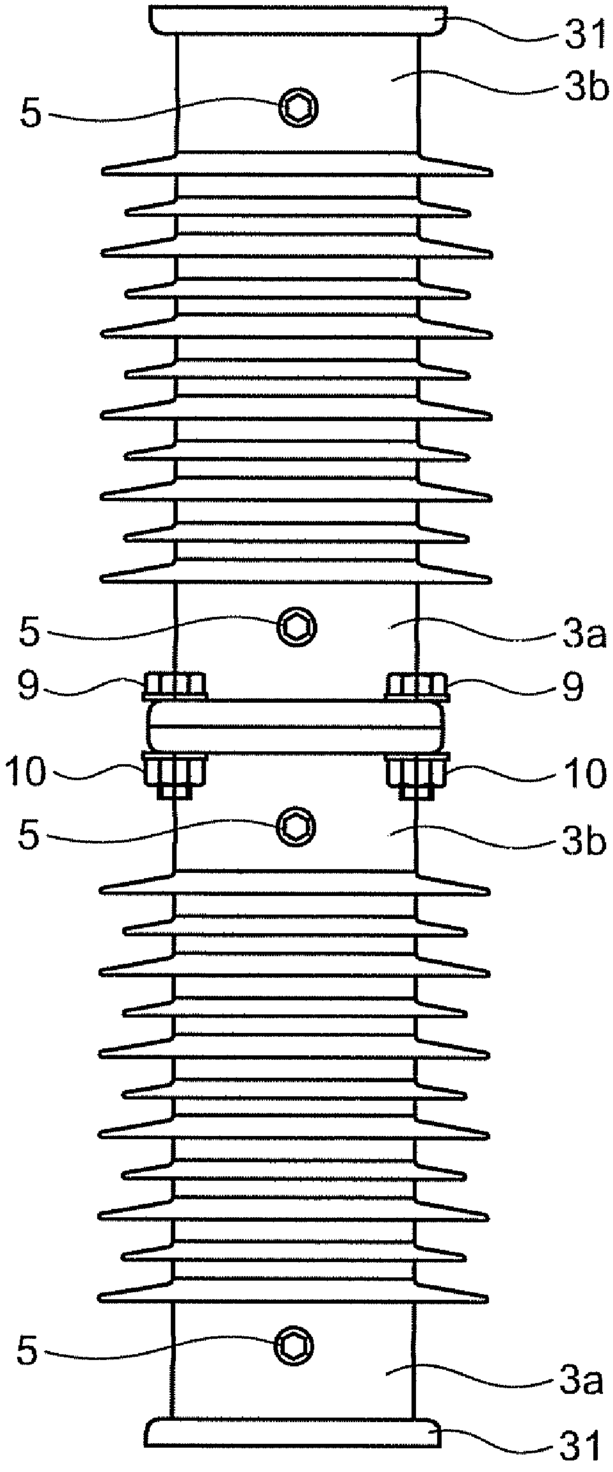
FIG. 5 is a front view of a structure assembled by stacking two lightning arresters.

FIG. 5 is a front view of a structure assembled by stacking two lightning arresters. As shown in FIG. 5, each flange through hole 34 on the flange 31 in the lower electrode 3*a* of the upper lightning arrestor aligns with one of the flange through holes 34 on the flange 31 in the upper electrode 3*b* of the lower lightning arrestor to form a pair of flange through holes 34. The two lightning arrestors are clamped by fixing a bolt 9 and a nut 10 through each pair of the flange through holes 34. Such a structure eliminates any need to separately use a flange joint component for clamping the lightning arresters. As a result, fewer components are required for stacking the lightning arresters thereby making the process of stacking and clamping easier and improving efficiency in the on-site installation.

Moreover, by reducing the components for stacking the lightning arresters, packaging and shipping of the lightning arresters also becomes easier.

Meanwhile, although a zinc oxide element is used as a nonlinear voltage resistor in the abovementioned lightning arrester, the present invention is not limited to the type of a nonlinear voltage resistor. Moreover, the present invention is also not limited to the type of an outer insulating cover or the material used in an insulating rod. Furthermore, although four insulating rods 4 are arranged in the abovementioned lightning arrester, it is possible to increase the number of the insulating rods 4. Moreover, instead of using a coil spring as the pressing spring 2, a plate spring can also be used. Furthermore, instead of using bolts and nuts as the fastening members, various other types of fastening members can be used.

Thus, according to an aspect of the present invention, a stress that works in the direction of pushing away a pair of electrodes as well as a reaction force of a pressing spring is absorbed by a shearing force for a plurality of insulating rods. As a result, the insulating rods remain tightly fixed to the pair of electrodes.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A lightning arrester comprising:

a serial unit including a nonlinear voltage resistor block formed with a stack of a plurality of nonlinear voltage resistors, and a compression spring that is arranged at one end of the nonlinear voltage resistor block and that exerts a predetermined reaction force on the nonlinear voltage resistor block in its stacking direction;

a pair of electrodes arranged to sandwich the serial unit in its stacking direction;

a plurality of insulating rods arranged around the serial unit along its stacking direction to couple the electrodes;

a plurality of fastening members that fastens the insulating rods and the electrodes; and an insulating outer covering member that integrates internal elements including the serial unit and the insulating rods by directly covering the internal elements, wherein each of the electrodes has a plurality of insulating-rod inserting holes for inserting end portions of the insulating rods, and a plurality of fastening-member mounting holes each being perpendicular to a corresponding insulating-rod inserting hole, and both end portions of each of the insulating rods have a fastening-member through hole such that the insulating rods and the electrodes are fastened by inserting the fastening members through fastening-member through holes and mounting the fastening members on the fastening-member mounting holes.

2. The lightning arrester according to claim 1, wherein a distance between the electrodes is set such that the reaction force is exerted on the serial unit by the compression spring.

3. The lightning arrester according to claim 1, wherein each of the electrodes includes a joint portion with a joint hole for inserting a clamping member to connect the lightning arrester to another lightning arrester by stacking the lightning arresters.

4. The lightning arrester according to claim 2, wherein each of the electrodes includes a joint portion with a joint hole for inserting a clamping member to connect the lightning arrester to another lightning arrester by stacking the lightning arresters.

5. A method of manufacturing a lightning arrester including a serial unit that includes a nonlinear voltage resistor block formed with a stack of a plurality of nonlinear voltage resistors and a compression spring that is arranged at one end of the nonlinear voltage resistor block and that exerts a predetermined reaction force on the nonlinear voltage resistor block in its stacking direction, a pair of electrodes arranged to sandwich the serial unit in its stacking direction, a plurality of insulating rods arranged around the serial unit along its stacking direction to couple the electrodes, a plurality of fastening members that fastens the insulating rods and the electrodes, and an insulating outer covering member that integrates internal elements including the serial unit and the insulating rods by directly covering the internal elements, the method comprising:

forming a plurality of insulating-rod inserting holes for inserting end portions of the insulating rods and a plurality of fastening-member mounting holes each being perpendicular to a corresponding insulating-rod inserting hole on the electrodes;

forming a fastening-member through hole on both end portions of each of the insulating rods;

inserting the both end portions of each of the insulating rods into the insulating-rod inserting holes, respectively;

exerting the tension on the serial unit by the compression spring in a direction of compressing a distance between the electrodes;

aligning the fastening-member inserting holes with the fastening-member through holes;

inserting the fastening members through the fastening-member through holes; and fastening the insulating rods and the electrodes by mounting the fastening members on the fastening-member mounting holes.

6. A method of assembling a lightning arrester by using an assembly jig, the lightning arrester including a serial unit that includes a nonlinear voltage resistor block formed with a stack of a plurality of nonlinear voltage resistors and a compression spring that is arranged at one end of the nonlinear voltage resistor block and that exerts a predetermined reaction force on the nonlinear voltage resistor block in its stacking direction, a pair of electrodes including an upper electrode and a lower electrode arranged to sandwich the serial unit in its stacking direction, each electrode having a plurality of insulating-rod inserting holes for inserting end portions of a plurality of insulating rods and a plurality of fastening-member mounting holes each being perpendicular to a corresponding insulating-rod inserting hole, the plurality of insulating rods arranged around the serial unit along its stacking direction to couple the electrodes, each insulating rod having a fastening-member through hole on both end portion of each of the insulating rods, a plurality of fastening members that fastens the insulating rods and the electrodes, and an insulating outer covering member that integrates internal elements including the serial unit and the insulating rods by directly covering the internal elements, the assembly jig including an upper plate and a lower plate arranged opposite to each other at a distance regulated by a predetermined spring load exerted on the serial unit, the method comprising:

fitting one end of each of the insulating rods to the lower electrode;

inserting a jack between the upper electrode and the upper plate; and assembling the lightning arrester in a state in which a predetermined repulsing force is exerted between the lower electrode and the upper electrode by aligning the fastening-member inserting holes with the fastening-member through holes, and inserting the fastening members through the fastening-member through holes.

* * * * *